(12) United States Patent
Hirota

(10) Patent No.: US 9,536,663 B2
(45) Date of Patent: Jan. 3, 2017

(54) METALLIZED FILM CAPACITOR

(71) Applicant: Kojima Industries Corporation, Toyota-shi, Aichi (JP)

(72) Inventor: Naoya Hirota, Toyota (JP)

(73) Assignee: Kojima Industries Corporation, Toyota-shi, Aichi (JP)

( * ) Notice: Subject to any disclaimer, the term of this patent is extended or adjusted under 35 U.S.C. 154(b) by 101 days.

(21) Appl. No.: 14/558,322

(22) Filed: Dec. 2, 2014

(65) Prior Publication Data

US 2015/0162130 A1    Jun. 11, 2015

(30) Foreign Application Priority Data

Dec. 9, 2013 (JP) ................................. 2013-254358

(51) Int. Cl.
| | |
|---|---|
| H01G 4/33 | (2006.01) |
| H01G 2/16 | (2006.01) |
| H01G 4/012 | (2006.01) |
| H01G 4/015 | (2006.01) |
| H01G 4/232 | (2006.01) |
| H01G 4/30 | (2006.01) |
| H01G 4/18 | (2006.01) |

(52) U.S. Cl.
CPC .............. *H01G 2/16* (2013.01); *H01G 4/012* (2013.01); *H01G 4/015* (2013.01); *H01G 4/232* (2013.01); *H01G 4/33* (2013.01); *H01G 4/18* (2013.01); *H01G 4/30* (2013.01)

(58) Field of Classification Search
CPC ............ H01G 4/33; H01G 4/015; H01G 4/30; H01G 4/005
See application file for complete search history.

(56) References Cited

U.S. PATENT DOCUMENTS

| | | | |
|---|---|---|---|
| 5,933,947 A * | 8/1999 | Minamizawa | H01G 4/012 29/25.41 |
| 2006/0050467 A1* | 3/2006 | Shiota | H01G 2/16 361/303 |

(Continued)

FOREIGN PATENT DOCUMENTS

| | | |
|---|---|---|
| JP | 10-149939 | 6/1998 |
| JP | 2005012082 | 1/2005 |
| WO | WO 2012/164903 A1 | 12/2012 |

OTHER PUBLICATIONS

European Search Report for EP14196108.6 dated Apr. 17, 2015.

*Primary Examiner* — Nguyen Ha

(74) *Attorney, Agent, or Firm* — Eric D. Babych; Brinks Gilson & Lione

(57) ABSTRACT

A metallized film capacitor includes an element formed by cutting a laminate made of a pair of metallized films to a predetermined length, and the element includes metallized contact electrodes disposed on both end faces in a width direction of the element. On each dielectric film, there are formed a protection mechanism portion including a plurality of segmented electrodes that are coupled with each other via a fuse, a solid electrode connecting with the metallized contact electrode of a corresponding polarity, and a vertical pattern extending across the dielectric film in the length direction between the protection mechanism portion and the solid electrode. The position and the width of the vertical pattern are set such that the range of the vertical pattern in the width direction overlaps the vertical pattern of a metallized film which forms a pair.

1 Claim, 9 Drawing Sheets

(56) References Cited

U.S. PATENT DOCUMENTS

2013/0342960 A1* 12/2013 Saita ................. H01G 4/008
361/305
2014/0036405 A1 2/2014 Takeoka et al.
2014/0355174 A1* 12/2014 Kamiura ............. H01G 4/012
361/305

* cited by examiner

METALLIZED FILM CAPACITOR

CROSS-REFERENCE TO RELATED APPLICATIONS

This application claims priority to Japanese Patent Application No.2013-254358, filed on Dec. 9, 2013, which is incorporated herein by reference in its entirety.

TECHNICAL FIELD

The present invention relates to a metallized film capacitor formed by cutting a laminate made of a pair of metallized films, each having an internal electrode formed on a dielectric film by metal vapor deposition, to a predetermined length and providing external electrodes on both end faces in the width direction of an element obtained by the cutting.

BACKGROUND

Metallized film capacitors having electric properties of high withstand voltage and low loss have drawn attention recently, and there has also been a noticeable trend to adopt such metallized film capacitors having an extremely long lifetime, in association with the demand for maintenance-free products in the market.

Metallized film capacitors are generally categorized into those including a metal leaf as an internal electrode and those including a vapor-deposited metal which is provided on a dielectric film and used as an internal electrode. Of these metallized film capacitors, the metallized film capacitors including a vapor-deposited metal as an internal electrode, which occupies a smaller area than that of the metal leaf electrode and therefore can reduce the size and weight thereof, have been conventionally used. (See JP 10-149939 A, for example).

FIG. 8 is a view illustrating a structure of this type of conventional metallized film capacitor 10, and FIG. 9 is a side view of the metallized film capacitor 10. While in FIG. 8 and FIG. 9, the thickness β of a dielectric film 20P, 20N is shown greater than the actual scale for the sake of clarity, the thickness β of the dielectric films 20P and 20N is actually sufficiently smaller than the width α of a vertical pattern 26P, 26N. For example, the thickness β of the dielectric films 20P and 20N is approximately 1/50 to 1/300 the width α of the vertical pattern 26P, 26N, and is more preferably 1/100 to 1/300 the width α of the vertical pattern 26P, 26N. Further, in the following description, when it is not necessary to discriminate between the P-polarity side and the N-polarity side, the letters "P" and "N" will be omitted from reference numerals.

A metallized film 12 forming the metallized film capacitor 10 is formed by vapor deposition of a metal such as aluminum onto one side of a dielectric such as a polypropylene film. A laminate formed by stacking this metallized film 12 is cut to a predetermined length. On each of both ends in the width direction of an element obtained by such cutting, a metallized contact electrode 14 is disposed as an external electrode.

On one side of each metallized film 12, an edge margin portion 22, a protection mechanism portion 24, a vertical pattern 26, and a solid electrode 28 are sequentially arranged in this order in the width direction. The edge margin portion 22 is a portion of the metallized film 12 at one edge where no metal is vapor-deposited and is provided to extend across the metallized film 12 in the length direction. The protection mechanism portion 24 including a plurality of segmented electrodes 30 arranged therein is disposed adjacent to this edge margin portion 22. The segmented electrodes 30 are segmented by an insulating slit pattern 32 and are simultaneously connected with each other via a fuse 34.

The solid electrode 28 is a portion having a metal vapor-deposited on the entire surface thereof and is contiguous to the metallized contact electrode 14. The vertical pattern 26, which is a slit pattern extending across the metallized film 12 in the length direction, is provided between the solid electrode 28 and the protection mechanism portion 24. Several fuses 34 are provided along the vertical pattern 26, and the solid electrode 28 and the segmented electrodes 30 are interconnected via the fuse 34.

The metallized films 12 are stacked such that the locations of the edge margin portions 22 in the width direction are alternately opposite. In other words, the metallized films 12 are stacked such that the metallized contact electrodes 14 of different polarities connect to the solid electrodes 28 in an alternating manner.

The conventional metallized film capacitor 10 configured as described above has a self-healing function specific to the metal vapor deposition electrode (which means a property of restoring the function of a capacitor by evaporation and dispersion of the internal electrode around a defect portion, and is generally referred to as "self-healing property"), and further has a property which, when a large amount of electric current flows in the segmented electrodes, due to deficiency of the segmented electrodes, dispersion of the fuse occurs to thereby break electrical connection of the deficient segmented electrodes, thereby restoring a normal state of the electric current. As such, the metallized film capacitor 10 has a characteristic nature against dielectric breakdown and therefore has excellent reliability.

As described above, the metallized film capacitor 10 illustrated in FIGS. 8 and. 9 is formed by cutting the laminate made of the metallized films 12 to a predetermined length. Normally, a cut section formed by such cutting is provided with an insulating film for securing insulation. While no problems would arise if this insulating film has a sufficient thickness such that insulation is reliably secured, there is a possibility that dielectric breakdown would occur in the cut section if this insulating film is thin or the insulating film is deficient.

Specifically, if the insulating film on the cut section is thin, the electric current flowing into the solid electrode 28P on the P-polarity side flows into the segmented electrode 30N located immediately under the solid electrode 28P along the cut section, as indicated by dashed lines in FIG. 9. In this case, due to dispersion of the fuses around the segmented electrode 30N, the segmented electrode 30N is electrically disconnected from a segmented electrode within the same plane. However, because the creepage distance between this segmented electrode 30N and the segmented electrode 30P located immediately above the segmented electrode 30N (the thickness β of the dielectric film 20) is very small, the segmented electrode 30N is not electrically disconnected from the segmented electrode 30P. As a result, the electric current also flows to the segmented electrode 30P located immediately above the segmented electrode 30N along the cut section. Further, according to a similar principle, this electric current further flows to the segmented electrode 30N located immediately under the segmented electrode 30P, and further to the segmented electrode 30P located immediately above the segmented electrode 30N, and finally to the solid electrode 28N located immediately under the segmented electrode 30P. This results in short circuit between the solid electrode 28P on the P-polarity side and the solid electrode 28N on the N-polarity side, which may lead to dielectric breakdown between these solid electrodes 28P and 28N.

It is therefore an advantage of the present invention to provide a metallized film capacitor which is designed to prevent such dielectric breakdown on a cut section more reliably.

BRIEF SUMMARY

In accordance with one aspect of the present invention, a metallized film capacitor includes an element formed by cutting a laminate made of a pair of metallized films, each having an internal electrode formed on a dielectric film, to a predetermined length, and the element includes external electrodes disposed on both end faces in a width direction of the element. The metallized film capacitor includes, on each dielectric film, a protection mechanism portion which is divided, by an insulating slit pattern, into a plurality of segmented electrodes that are coupled with each other via a fuse; a solid electrode connecting to the external electrode of a corresponding polarity, the solid electrode extending across the dielectric film in a length direction which is orthogonal to the width direction; an edge margin portion which is located at one end side in the width direction of the dielectric film and is a portion having no metal vapor-deposited thereon, the edge margin portion extending across the dielectric film in the length direction; and a vertical pattern extending across the dielectric film in the length direction between the protection mechanism portion and the solid electrode. Two metallized films forming a pair of metallized films are stacked such that the edge margin portions thereof are located at opposite sides in the width direction, and a position and a width of the vertical pattern are set such that a range of the vertical pattern in the width direction overlaps, at least at both ends thereof in the length direction, the vertical pattern or the edge margin portion of the metallized film which forms the pair.

In accordance with a preferable aspect, the width of the vertical pattern is equal to or greater than a creepage distance determined based on a voltage required by the metallized film capacitor.

According to the present invention, as the creepage distance corresponding to the width of the vertical pattern is generated between a pair of solid electrodes, it is possible to effectively prevent dielectric breakdown between these solid electrodes.

BRIEF DESCRIPTION OF THE DRAWINGS

Preferred embodiment(s) of the present invention will be described in detail based on the following figures, wherein.

DETAILED DESCRIPTION

Figure 1:
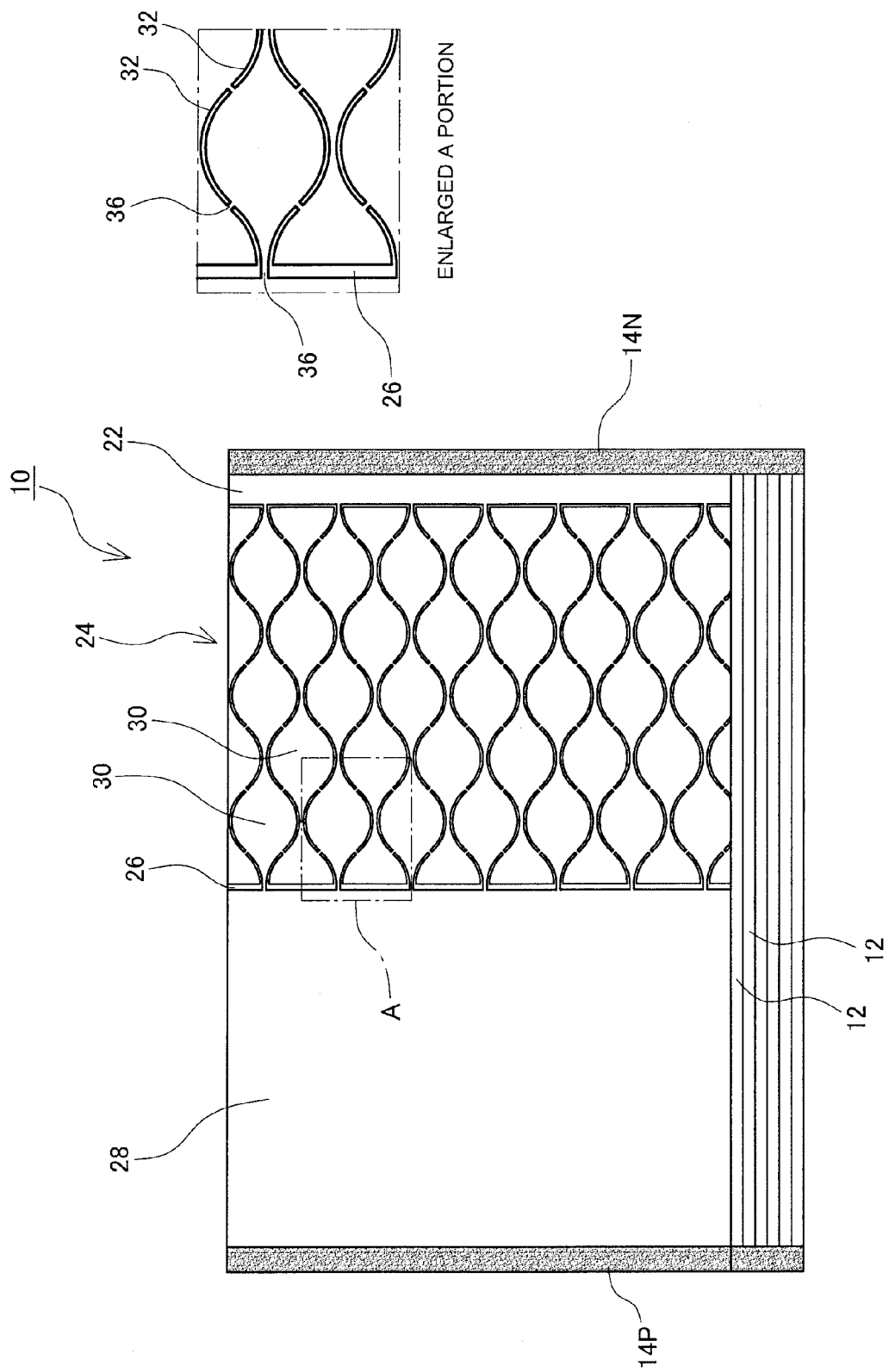
FIG. 1 is a view illustrating a structure of a metallized film capacitor according to an embodiment of the present invention.
Figure 2:
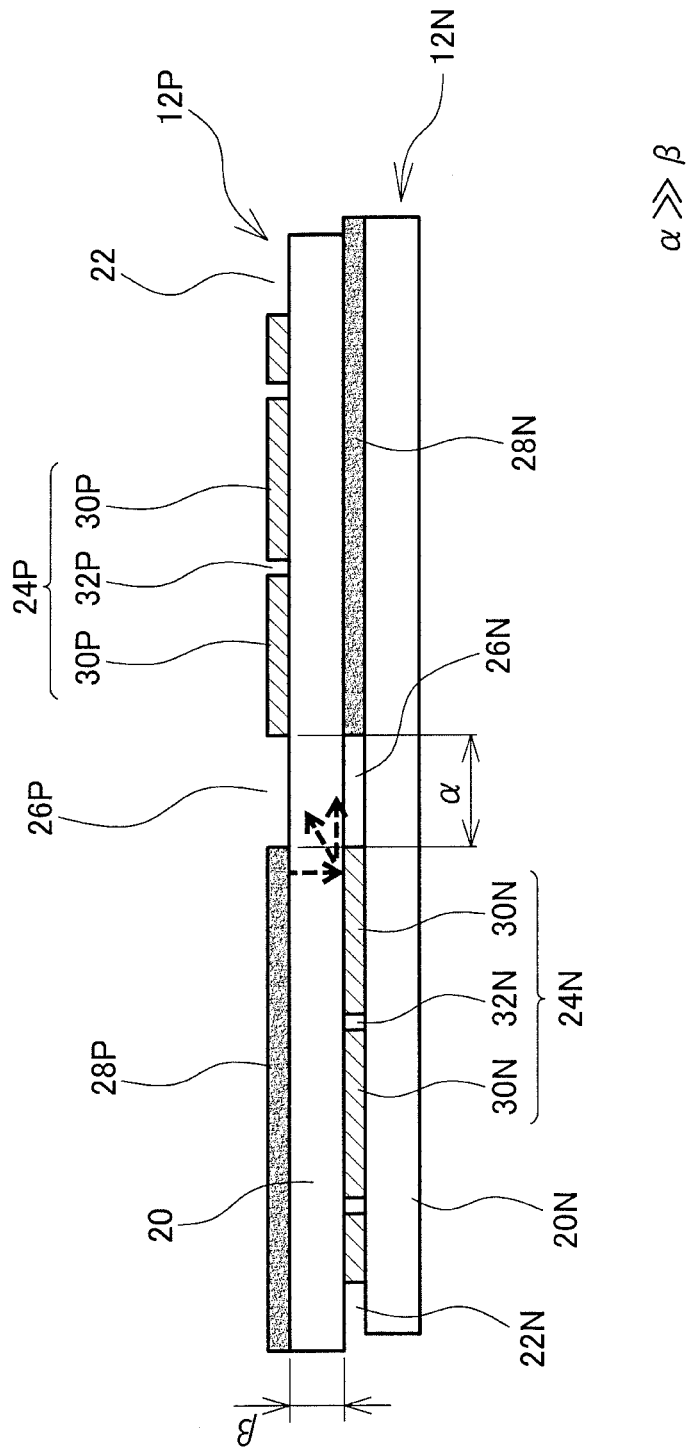
FIG. 2 is a side view of the metallized film capacitor.

Preferred embodiments of the present invention will be described in detail with reference to the accompanying drawings. FIG. 1 is a view illustrating a structure of a metallized film capacitor 10 according to an embodiment of the present invention, and FIG. 2 is a side view (view of a cut section) of the metallized film capacitor 10. While an insulating film is actually provided on a cut section of the metallized film capacitor 10, such an insulating film is omitted in FIGS. 1 and 2. Further, while in FIG. 1 and FIG. 2, the thickness $\beta$ of a dielectric film 20 is shown great, the thickness $\beta$ of the dielectric film 20 is actually sufficiently smaller than the width of a vertical pattern 26 ($\alpha \gg \beta$). For example, the thickness $\beta$ of the dielectric film 20 is approximately $\frac{1}{50}$ to $\frac{1}{300}$ the width $\alpha$ of the vertical pattern 26.

A metallized film 12P, 12N forming the metallized film capacitor 10 (hereinafter, when it is not necessary to discriminate between the P-polarity side and the N-polarity side, the letters "P" and "N" will be omitted from reference numerals; The same also applies to other components) is formed by vapor deposition of a conductive metal onto one side of a dielectric film 20. The vapor-deposited metal functions as an internal electrode. Materials of the dielectric film 20 may include polypropylene, polyethylene terephthalate, polyethylene naphthalate, polyphenyl sulfide, polystyrene, and the like. While the thickness $\beta$ of the dielectric film 20 is not particularly limited, in the present embodiment, the dielectric film 20 having a thickness of about 3.0 μm is used. The metal to be vapor-deposited may include a metal such as aluminum, zinc, copper, iron, nickel, chromium, and the like, or an alloy thereof, and the like.

A laminate formed by stacking the metallized films 12 is cut to a predetermined length. On each of both ends in the width direction (right-left direction in FIG. 1) of an element obtained by such cutting, a metallized contact electrode 14 is disposed as an external electrode. In the following description, it is assumed that the metallized contact electrode 14P on the left side in FIG. 1 is an electrode on the P-polarity side, and the metallized contact electrode 14N on the right side in FIG. 1 is an electrode on the N-polarity side.

One end of each metallized film 12 in the width direction is not connected with the metallized contact electrode 14, and the other end is connected with the metallized contact electrode 14 of the corresponding polarity. On one side of the metallized film 12P, 12N, starting from the one end side not connected with the metallized contact electrode 14, an edge margin portion 22, a protection mechanism portion 24, the vertical pattern 26, and a solid electrode 28 are sequentially arranged in this order in the width direction. The edge margin portion 22 is a portion of the metallized film 12 at one side in the width direction where metal is not vapor-deposited or a vapor-deposited metal is removed. This edge margin portion 22 extends across the dielectric film 20 in the length direction thereof. The protection mechanism portion 24 including a plurality of segmented electrodes 30 is disposed adjacent to the edge margin portion 22. The segmented electrodes 30 are formed by dividing the metal vapor-deposited on the dielectric film 20 by an insulating slit pattern 32. The insulating slit pattern 32 is a slit formed by not vapor-depositing a metal partially or partially removing the vapor-deposited metal. The insulating slit pattern 32 includes fuses 36 which are metal vapor-deposited portions having a small width, and the plurality of segmented electrodes 30 are connected with each other via these fuses 36. This fuse 36 evaporates or disperses when a large amount of electric current flows in the segmented electrodes 30. Thus, the segmented electrode 30 in which a large amount of electric current flows is electrically disconnected from other segmented electrodes 30.

The solid electrode 28 is a portion having a metal vapor deposited on the entire surface thereof and is connected to the metallized contact electrode 14 of the corresponding polarity. In FIG. 2, the solid electrode 28 on the upper side is a solid electrode 28P on the P-polarity side and is connected with the P-polarity metallized contact electrode 14P, and the solid electrode 28 on the lower side is a solid electrode 28N on the N-polarity side and is connected with the N-polarity metallized contact electrode 14N. The vertical pattern 26, which is a slit pattern extending across the dielectric film 20 in the length direction, is provided between the solid electrode 28 and the protection mechanism portion 24. The vertical pattern 26 also includes some fuses 36 and the solid electrode 28, and the segmented electrodes 30 are connected with each other via the fuses 36. The width α of the vertical pattern 26 depends on a creepage distance which is determined by a voltage used in the capacitor 10, as will be detailed below, and is set to about 0.15 mm to 0.9 mm. As such, the width α of the vertical pattern 26 is sufficiently greater than the thickness β of the dielectric film 20.

When depositing the metallized films 12, the metallized films 12 are stacked such that the locations of the edge margin portions 22 of these metallized films 12 in the width direction are alternately opposite. In other words, the metallized films 12 are stacked such that the metallized contact electrodes 14 of different polarities connect to the solid electrodes 28 in an alternating manner. After the deposition, the laminate thus obtained is cut to a predetermined length, as described above. An insulating film (not shown) is provided on this cut section in order to secure insulation on this cut section. This insulating film is formed by, for example, dissolving the dielectric film 20 with heat generated during the cutting.

Figure 9:
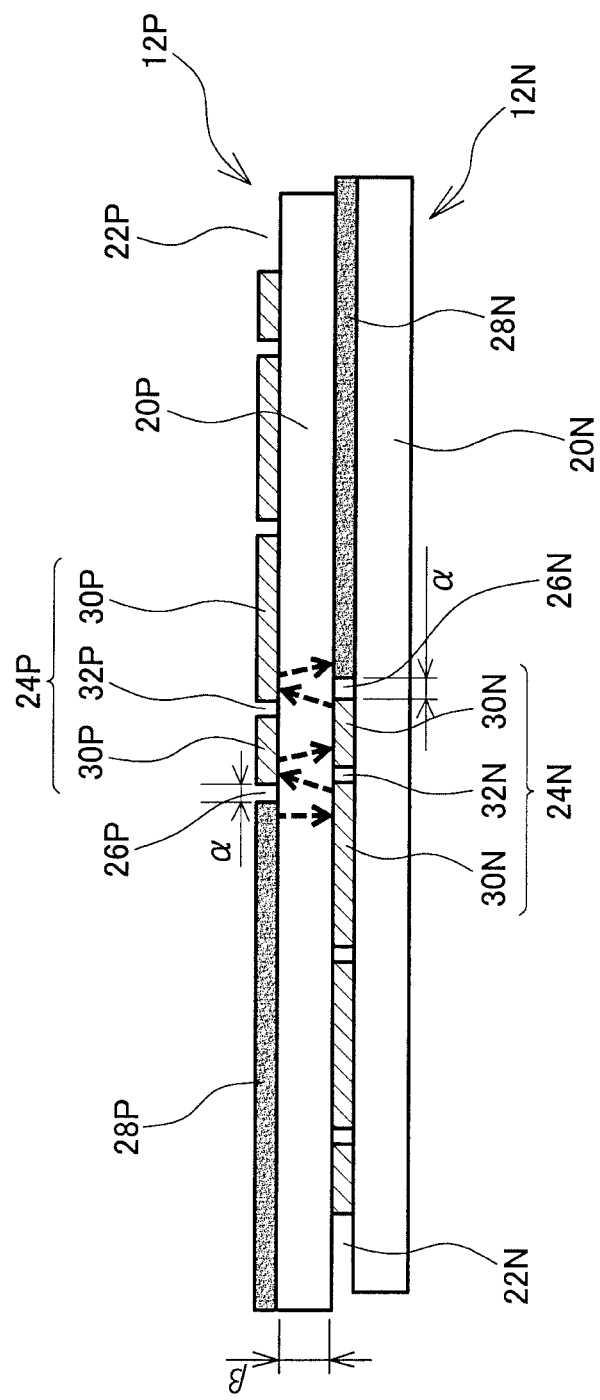
FIG. 9 is a side view of the metallized film capacitor illustrated in FIG. 8.

While essentially, this insulating film should have a sufficient thickness in order to reliably secure insulation on the cut section, various circumstances make the thickness of this insulating film insufficient, which may result in insufficient insulation on the cut section. In such a case, as shown by dashed lines in FIG. 9, the electric current flowing in one solid electrode 28P sequentially flows, along the cut section, into the segmented electrode 30N immediately below the solid electrode 28P into the segmented electrode 30P immediately above the segmented electrode 30N, and finally reaches the other solid electrode 28N. As such, there is a possibility that dielectric breakdown occurs between these two solid electrodes 28.

To address the above problem, according to the present embodiment, the vertical pattern 26N on the N-polarity side is positioned immediately under the vertical pattern 26P on the P-polarity side, hereby preventing dielectric breakdown on the cut section. With this structure, it is possible to maintain a large creepage distance on the cut section between the solid electrodes 28P and 28N to thereby effectively prevent the dielectric breakdown on the cut section between the solid electrodes 28P and 28N.

For example, as the thickness β of the dielectric film 20 is very thin, there is a possibility that, on the cut section, the solid electrode 28P on the P-polarity side becomes electrically conductive with the segmented electrode 30N located immediately below. When the upper and lower vertical patterns 26P and 26N are aligned, the creepage distance between the segmented electrode 30N which is electrically conductive with the P-polarity side solid electrode 28P, and the N-polarity side solid electrode 28N, or the segmented electrode 30P located immediately above the N-polarity side solid electrode 28N is substantially the same as the width α of the vertical pattern 26. As the width α of the vertical pattern 26 is sufficiently larger than the thickness β of the dielectric film 20, the dielectric breakdown between the segmented electrode 30N and the N-polarity side solid electrode 28N or the segmented electrode 30P located immediately above the N-polarity side solid electrode 28N is prevented, which further results in prevention of the dielectric breakdown between the P-polarity side solid electrode 28P and the N-polarity side solid electrode 28N on the cut section.

Figure 3:
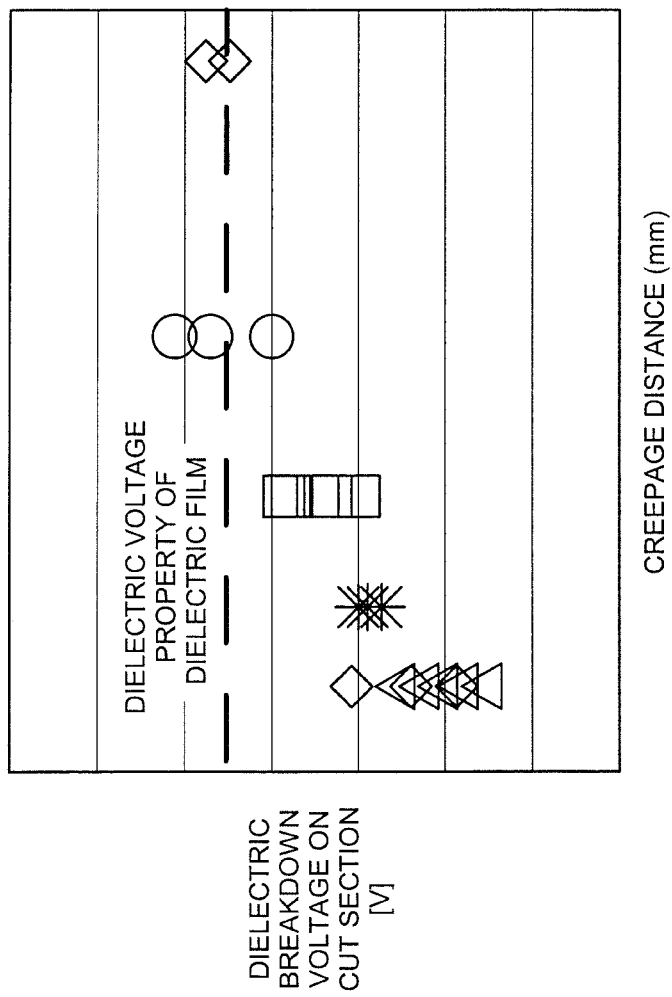
FIG. 3 is a graph indicating a relationship between dielectric breakdown voltage and a creepage distance.

Further, in order to further reliably prevent the dielectric breakdown on the cut section between the solid electrodes 28P and 28N, it is desirable to set the width α of the vertical pattern 26 based on the voltage used in the capacitor 10. FIG. 3 is a view indicating the relationship between the creepage distance and the dielectric breakdown voltage. As indicated in FIG. 3, generally, the voltage at which dielectric breakdown occurs (dielectric breakdown voltage) increases with the creepage distance. It is also possible to obtain the creepage distance at which dielectric breakdown can occur at a certain voltage by conducting an experiment or the like in advance. When setting the width α of the vertical pattern 26, it is desirable to obtain the creepage distance at which dielectric breakdown can occur with the maximum voltage used in the metallized film capacitor 10 and set the width α of the vertical pattern 26 to the creepage distance which is obtained or greater.

With the structure as described above, it is possible to effectively prevent the dielectric breakdown on the cut section between the solid electrodes 28P and 28N. The structure which has been described above is only an example and may therefore be modified, so long as the vertical pattern 26 is set to have a position and a width with which the range of the vertical pattern 26 in the width direction overlaps, at least at an end in the length direction thereof, the vertical pattern 26 or the edge margin portion 22 of the metallized film 12 forming a pair.

Figure 4:
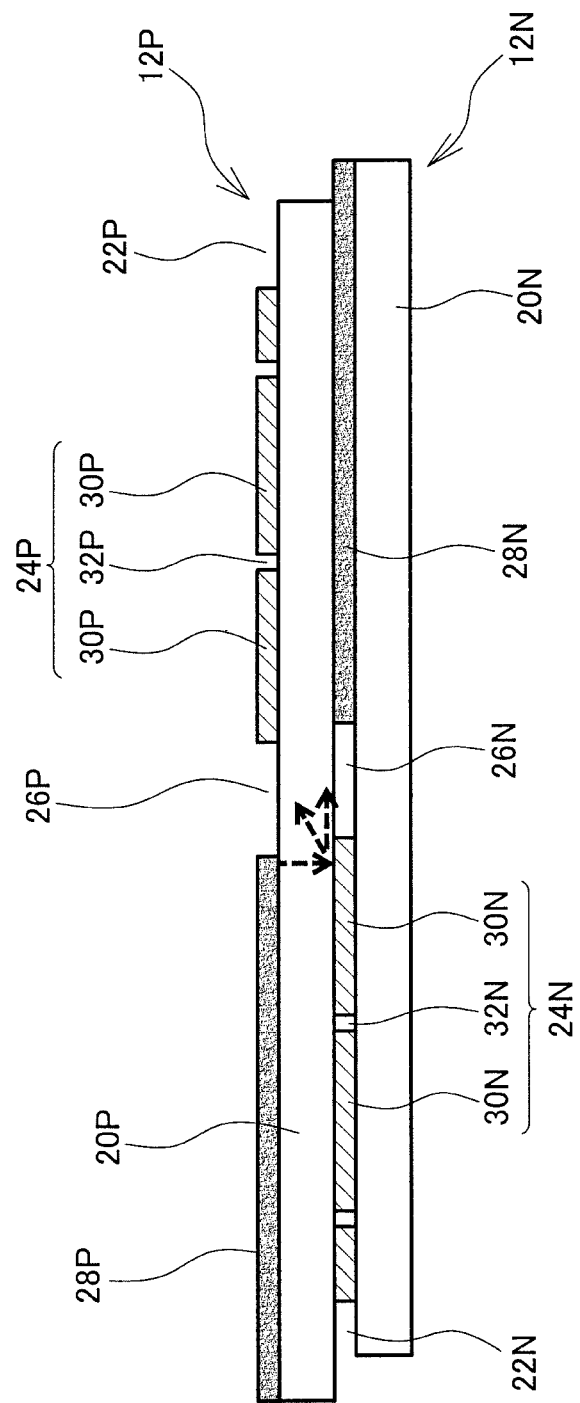
FIG. 4 is a side view of another metallized film capacitor.

For example, as illustrated in FIG. 4, the position of the vertical pattern 26P formed in one metallized film 12P may be slightly misaligned with respect to the vertical pattern 26N formed in the metallized film 12N forming a pair with the metallized film 12P, so long as their ranges in the width direction overlap with each other. In this case, even if the solid electrode 28P on the P-polarity side is electrically connected with the segmented electrode 30N located immediately below on the cut section, as there exists a creepage distance which has substantially the same size as the width α of the vertical pattern 26N between the segmented electrode 30N immediately below and the solid electrode 28N on the N-polarity side, it is similarly possible to effectively prevent the dielectric breakdown between the solid electrodes 28P and 28N.

Figure 5:
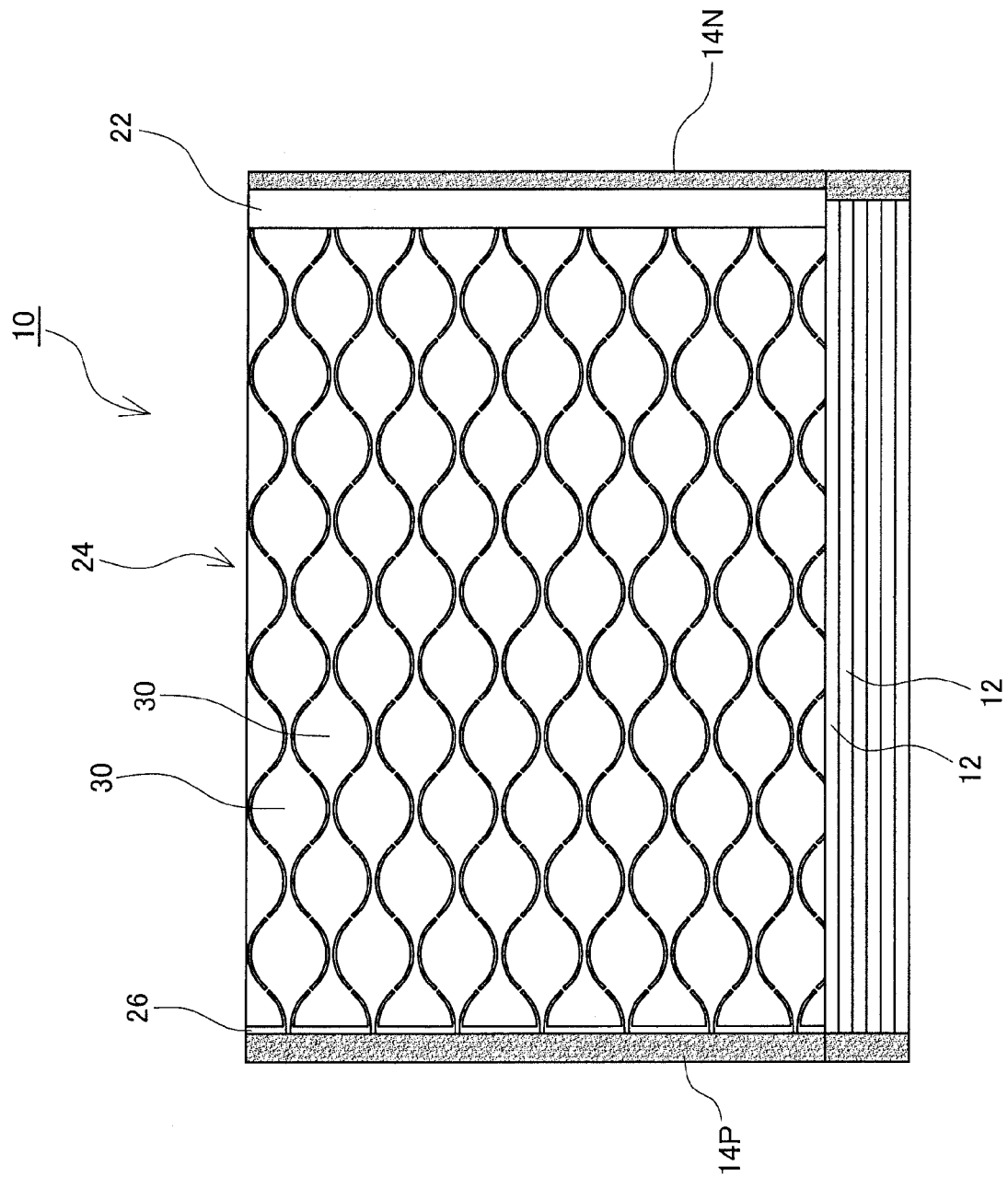
FIG. 5 is a view illustrating a structure of another metallized film capacitor.
Figure 6:
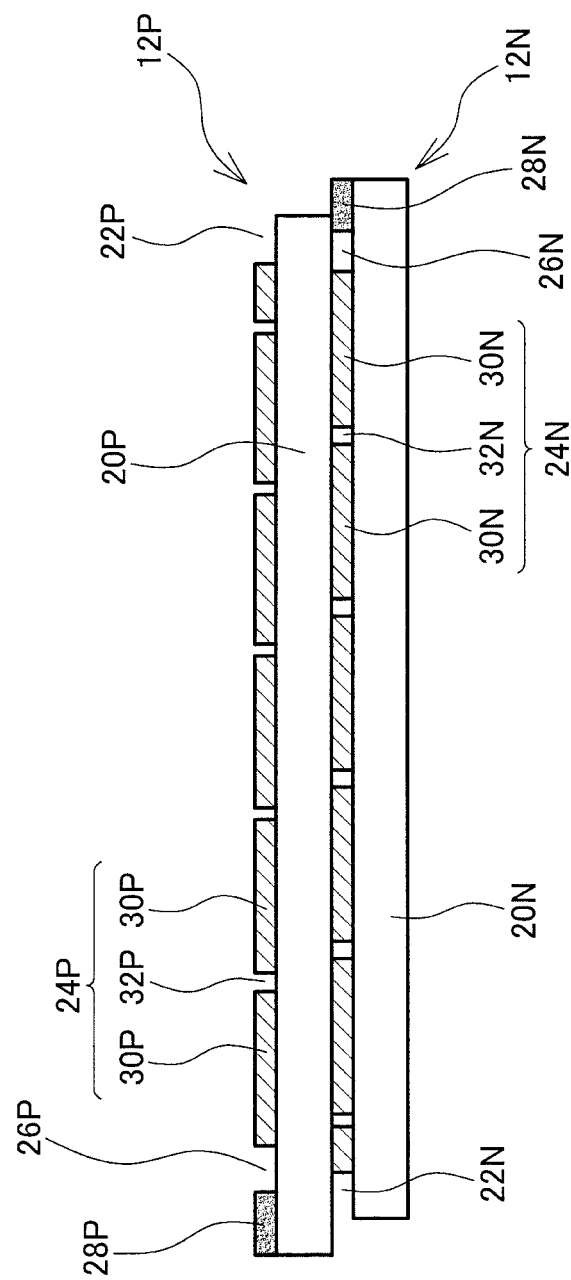
FIG. 6 is a side view of the metallized film capacitor illustrated in FIG. 5.

Alternatively, the vertical pattern 26 formed in one metallized film 12 and the edge margin portion 22 formed in the metallized film 12 forming a pair with the one metallized film 12 may be configured to overlap with each other in their ranges in the width direction. For example, the metallized film capacitor 10 may have a structure in which the greater part of the metallized film 12 is formed as the protection mechanism portion 24, as illustrated in FIG. 5. In this case, the metallized film 12 includes the solid electrode 28 extending across the dielectric film 20 in the length direction only at the end portion in the width direction, and also includes the vertical pattern 26 located adjacent to the solid electrode 28. When the metallized films 12 having such a structure are stacked such that the locations of the edge margin portions 22 in the width direction are alternately opposite with each other, as illustrated in FIG. 6, the positions of the vertical pattern 26P in one metallized film 12P and the vertical pattern 26N in the metallized film 12N forming a pair with the vertical pattern 26P in the width direction are significantly misaligned. While, in this structure, it is difficult to make the positions of these two vertical patterns 26P and 26N in the width direction overlap with each other, it is possible to make the range of the vertical pattern 26P formed in one metallized film 12P in the width direction overlap the range of the edge margin portion 22N in the metallized film 12N forming a pair with the metallized film 12P in the width direction. With this structure, as there exists a creepage distance having substantially the same size as the width α of the vertical pattern 26 between the solid electrode 28P connecting to the metallized contact electrode 14P on the P-polarity side and the solid electrode 28N of the metallized film 12, so that the dielectric breakdown between the solid electrodes 28P and 28N can be effectively prevented.

Figure 7:
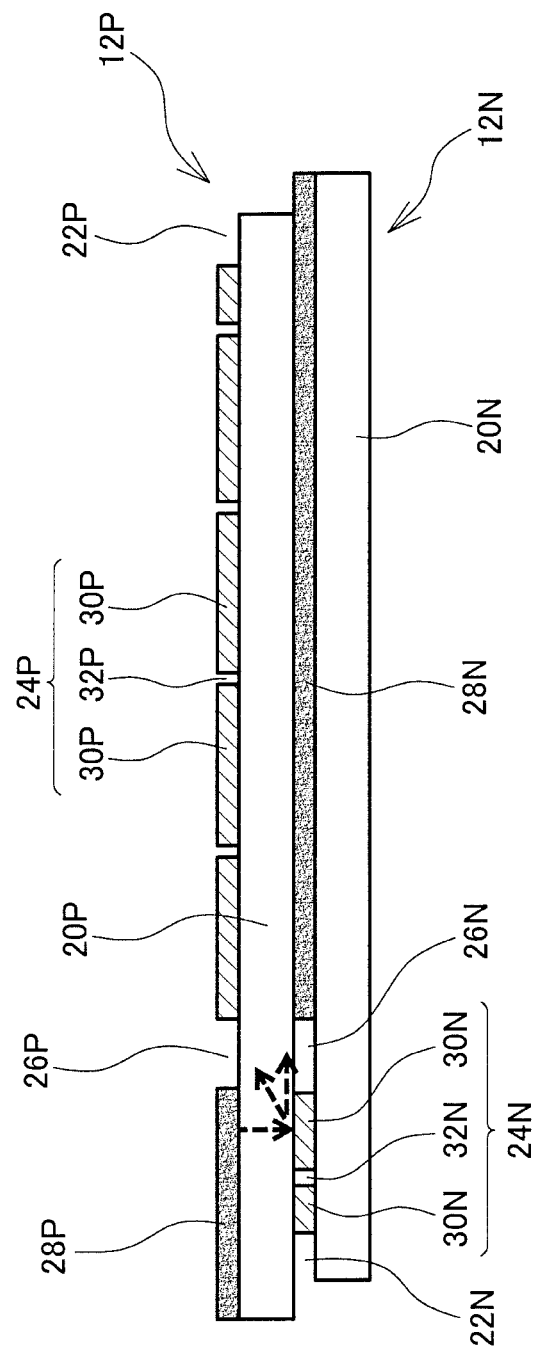
FIG. 7 is a side view of another metallized film capacitor.
Figure 8:
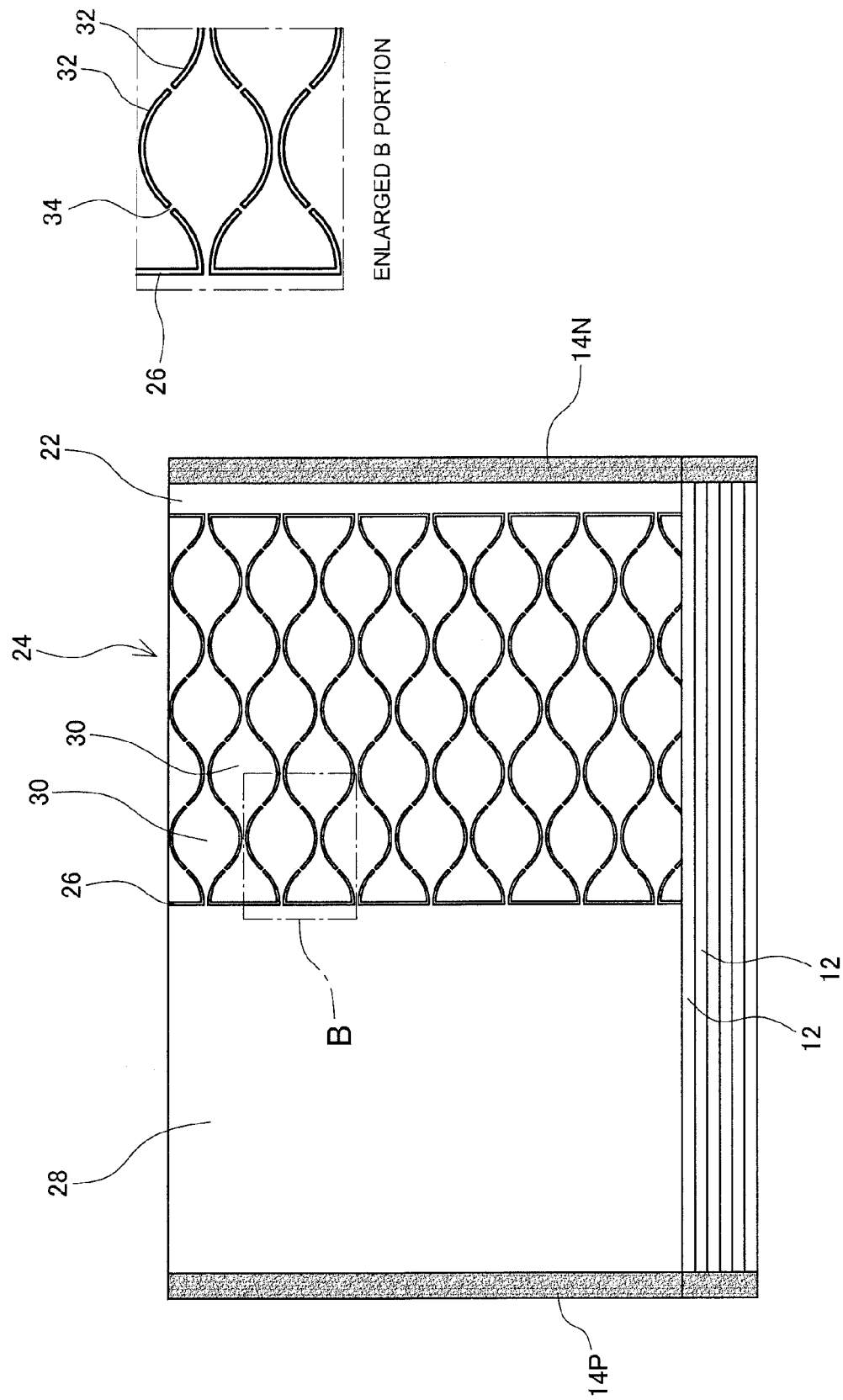
FIG. 8 is a view illustrating a structure of a conventional metallized film capacitor.

It is not necessary to form the metallized films 12P and 12N forming a pair in a bilateral symmetrical shape, and the solid electrodes 28 and the protection mechanism portions 24 may have different sizes between the metallized film 12P on the P-polarity side and metallized film 12N on the N-polarity side, as illustrated in FIG. 7. In this case, as in the examples described above, the range of the vertical pattern 26 in one metallized film 12 in the width direction is made to overlap the range of the vertical pattern 26 or the edge margin portion 22 of the metallized film 12 forming a pair in the width direction.

While in the examples which have been described above, both the vertical pattern 26 and the edge margin portion 22 are formed in a straight line shape, they may have a curved line shape or a bent line shape. Further, so long as the vertical pattern 26 and the edge margin portion 22 have a width which is capable of insulation at the end thereof in the length direction, the width of the vertical pattern 26 and the edge margin portion 22 in other locations may be modified as appropriate. For example, the vertical pattern may have a greater width at both ends in the length direction or may have a greater width as the end portions are approached. Further, it is only necessary that the ranges of the vertical pattern 26 and the edge margin portion 22 in the width direction overlap at end portions in the length direction and that the ranges of the vertical pattern 26, and the edge margin portion 22 in the width direction need not overlap at other locations (at the intermediate position in the length direction, for example). As such, the capacitor 10 may have a structure in which the vertical pattern 26 of one metallized film 12 and the vertical pattern 26 or the edge margin portion 22 of the other metallized film forming a pair overlap with each other only at both ends thereof in the length direction and do not overlap at other locations in the length direction. In addition, while FIG. 1 and FIG. 5 illustrate the insulating slit pattern 32 in a sine wave shape, the shape of the insulating slit pattern 32 may be modified as appropriate, so long as it is possible to divide the vapor deposited metal into smaller areas. For example, the insulating slit pattern 32 may have a lattice shape.

While the preferred embodiments of the present invention have been described using specific terms, such description is for illustrative purposes only, and it is to be understood that changes and variations may be made without departing from the spirit or scope of the appended claims.

The invention claimed is:

1. A metallized film capacitor comprising an element formed by cutting a laminate made of a pair of metallized films, each metallized film having an internal electrode formed on a dielectric film, to a predetermined length, the element including end faces formed by cutting the laminate, the end faces being on opposite sides of the element in a width direction of the element, the element including an external electrode disposed on each end face, the metallized film capacitor comprising on each dielectric film:

a protection mechanism portion which is divided, by an insulating slit pattern, into a plurality of segmented electrodes, wherein in at least one of the segmented electrodes is coupled to at least another segmented electrode via a fuse;

a solid electrode connecting to the external electrode of a corresponding polarity, the solid electrode extending across the dielectric film in a length direction which is orthogonal to the width direction;

an edge margin portion which is located at one end side in the width direction of the dielectric film, the edge margin portion having no metal vapor-deposited thereon, the edge margin portion extending across the dielectric film in the length direction; and a vertical pattern extending across the dielectric film in the length direction between the protection mechanism portion and the solid electrode, wherein the pair of metallized films are stacked such that the edge margin portions of each metallized film are located at the opposite sides of the element in the width direction, and a position and a width of the vertical pattern are set such that a range of the vertical pattern in the width direction overlaps, at least at both ends thereof in the length direction, the vertical pattern or the edge margin portion of the metallized film which forms the pair, and the width of the vertical pattern is equal to or greater than a creepage distance at which dielectric breakdown occurs with a maximum voltage used in the metallized film capacitor, and is 50 times the thickness of the dielectric film or greater.

* * * * *